United States Patent [19]

Frain et al.

[11] Patent Number: 4,571,268

[45] Date of Patent: Feb. 18, 1986

[54] SINGLE PACKAGE ZINC-RICH COATINGS

[75] Inventors: Laura M. Frain, Chicago; Paul A. Petkus, Hickory Hills, both of Ill.

[73] Assignee: The Sherwin Williams Company, Cleveland, Ohio

[21] Appl. No.: 728,988

[22] Filed: Apr. 30, 1985

[51] Int. Cl.$^4$ .............................................. C09D 5/10
[52] U.S. Cl. ................... 106/1.17; 106/14.33; 106/287.16
[58] Field of Search ................ 106/1.17, 14.33, 14.05, 106/287.16

[56] References Cited

U.S. PATENT DOCUMENTS

| | | | |
|---|---|---|---|
| 3,660,119 | 5/1972 | Oken | 106/1 |
| 3,832,204 | 8/1974 | Boaz | 106/287 |
| 3,859,101 | 1/1975 | Slater | 106/1 |
| 4,014,703 | 3/1977 | Hayati et al. | 106/1 |
| 4,162,244 | 7/1979 | Bertram | 260/37 |
| 4,209,555 | 6/1980 | Stewart | 427/292 |

*Primary Examiner*—Lorenzo B. Hayes
*Attorney, Agent, or Firm*—James V. Tura; Robert E. McDonald

[57] ABSTRACT

The invention relates to a single package zinc-filled coating particularly useful as applied to metal substrates. The zinc-rich coatings comprise mixtures of partially hydrolyzed ethyl silicate with large amounts of metal particles such as zinc dust in an organic solvent with an alkali metal nitrate as the catalyst. The coating compositions are substantially stable in the absence of moisture and therefore having a long shelf life and can be applied by conventional methods to obtain completely cured films under ambient conditions.

10 Claims, No Drawings

SINGLE PACKAGE ZINC-RICH COATINGS

BACKGROUND OF THE INVENTION

This invention is directed to a single package zinc-filled coating which when applied to a metal surface imparts galvanic protection. More specifically, this invention is directed to stable zinc-rich coatings comprising mixtures of partially hydrolyzed ethyl silicate and zinc dust in an organic solvent with an inorganic catalyst. This composition is stable at ambient temperatures but is highly reactive in atmospheric moisture and therefore cures rapidly when exposed to air. Zinc metal-containing coatings utilizing hydrolyzed ethyl silicate as the binders are well known compositions which have been used for the protection of ferrous metal surfaces. In accordance with this invention, single package corrosion resistant coatings are obtained from zinc in a mixture of hydrolyzed ethyl silicate in an organic solvent with an alkali metal salt catalyst. These mixtures are substantially stable in the absence of moisture and exhibit little or no viscosity increase or gasing during storage and can be applied by conventional methods to obtain a completely cured film under ambient conditions. These coatings exhibit excellent corrosion resistance at thicknesses as low as 0.5 mil and therefore are particlarly useful as primers on various metal surfaces such as steel etc.

Zinc-filled protective coatings have been used as corrosion inhibiting compositions as disclosed, for example, in U.S. Pat. Nos. 3,056,684 and 3,615,730. These zinc-filled coatings, however, were obtained by adding zinc to the vehicle at the time of packaging and thereby the reactivity of the zinc with the vehicle caused gelling thereby resulting in an unacceptable short shelf life. Moreover, many of the single package zinc-filled coatings have the disadvantage of evolving gas i.e. hydrogen in the container when stored at ambient or room temperatures for periods exceeding 60 days or more. Thus, it was not possible to prepare a single package zinc-filled silicate coating which is stable for periods of several months or more and which can be used for coatings having the desired hardness, shelf life, pot life, and film forming qualities.

It is known that ethyl silicate reacts with moisture and hydrolyzes to silica and therefore it has been proposed that the silicates be used as a vehicle for paints. However, in the absence of a catalyst, the silicates react slowly and therefore are not practical for use as coatings unless the silicate has been hydrolyzed to a fairly stable solution of a partially hydrolyzed silicate. The coating will absorb even relatively small amounts of atmospheric moisture thereby completing the hydrolysis of the silicate to a fully hydrolyzed silicate. There is however a practical limitation as to how much this conversion can be accelerated by prehydrolyzing the silicate. It has been found that partially hydrolyzed ethyl silicate, for example, can be used to make a good zinc-rich paint to protect steel and other metals from corrosion. This is accomplished when the partially hydrolyzed silicate e.g. hydrolyzed to levels of 40–65% is mixed with metal dust such as zinc dust and applied to the metal substrate as a coating. However, in order to obtain optimum conditions to harden zinc-rich paints, there is a minimum requirement of atmospheric conditions i.e. humidity and temperature.

SUMMARY OF THE INVENTION

This invention relates to corrosion resistant coatings and more specifically to zinc-filled partially hydrolyzed ethyl silicates capable of being applied to various metal substrates to provide galvanic protection of the surface. The one package cathodic corrosion-resistant zinc-filled coatings of this invention are stable during storage in the absence of moisture with very little if any viscosity increase, and no gasing during storage. The coating can be applied in films of various thicknesses which are capable of drying into hard protective coatings at room temperatures.

PREFERRED EMBODIMENT

This invention is directed to an improved corrosion resistant galvanic coating for metal substrates which comprises a blend of powdered or finely divided metals such as zinc dust mixed with a partially hydrolyzed silicate to form a slurry which when applied to the metal substrate forms a hard film or coating.

More specifically, the single package zinc-rich coating comprises by weight of the total composition from about 1.0 to 20% by weight of a partially hydrolyzed ethyl silicate, 1.0 to 50% by weight of at least one organic solvent, 30 to 75% by weight of a metal powder such as zinc powder, 0 to 2.0% by weight of ethyl cellulose, 0 to 5.0% by weight of an organic polymeric thickener, 0 to 20% by weight of an inorganic filler such as 1.0 to 10% by weight of either mica, clay or combinations thereof and small but effective amounts of coloring agents or pigment e.g. from 0 to 5.0% by weight and catalytic amounts e.g. amounts ranging from 0.1 to about 1.5% by weight of an alkali metal nitrate selected from the group consisting of lithium nitrate, potassium nitrate and sodium nitrate.

The ethyl silicate useful for purposes of this invention exist in various forms e.g. tetraorthosilicate. Commercial ethyl silicates are obtained, for example, by reacting silicone tetrachloride with ethanol. The preferred alkyl polysilicates are the alkyl polysilicate i.e. ethyl polysilicate having from about 35 to 45% available silica and containing an average of five silicone atoms per molecule. A more detailed description of partially hydrolyzed organosilicone compounds are described by H. D. Hogan et al. in *Ethyl Silicates In The Industrial And Engineering Chemistry*, Vol. 39, p. 1364 and in U.S. Pat. Nos. 3,056,684 and 3,392,036.

The silicates can be prepared by mixing ethyl polysilicate with sufficient water and acid catalysts to hydrolyze the silicate to levels ranging up to 90% in the presence of organic solvents having boiling points ranging up to about 250° C. It has been found that a certain level of hydrolysis e.g. from 40–65% is essential in order to obtain a single package coating having the desired hardness, shelf life, pot life, etc. If, for example, the hydrolysis level of the alkyl polysilicate is below 40, the pencil hardness of the resulting coating after an hour is less than 4B, and after about 24 hours the pencil hardness is about F. The degree of hydrolysis referred to herein is the amount of water necessary to hydrolyze from 40 to 65% of the alkoxy groups linked to the silicone atoms calculated on the basis of tetraethylorthosilicate.

The zinc-rich coatings are prepared by mixing the prehydrolyzed ethyl silicate vehicle, described herein, with finely divided solids e.g. metals such as zinc dust together with other additives including fillers, coloring agents, thickeners, extenders, etc.

The fillers or extenders which may be employed include metal oxides such as iron and lead oxide, and various other fillers such as clays, talc, silica, gypsum and the like. Pigments include aluminum powders, chromic oxide, graphite, magnesium oxide, silicas, phthalocyanine blues and greens, and similar pigments found in the National Paint Varnish and Lacquer Pigment Text. In addition, other pigments such as chromates, sulfides and various known coloring agents generally utilized in coatings may be used in effective amounts to obtain the desired color.

The ratio of the silicate vehicle to the particular solids depends on the ultimate use of the coating, but generally ranges from 0 to 90% by weight of the ethyl silicate. The coatings of this invention may be cured at ambient temperatures for periods ranging from about 0.25 to 24 hours. If desired, heat may be applied to obtain a more rapid cure at temperatures of 40° C. to as high as 250° C. The coatings may be applied to clean metal substrates by painting, spraying or conventional methods. In some instances the coatings may be successfully applied to surfaces without prior cleaning.

Preferably, the single package zinc-rich coating of this invention comprises from about 5.0 to 15% by weight of a partially hydrolyzed ethyl silicate e.g. hydrolyzed to levels of 40 to 65% and containing about 33% $SiO_2$, 1.0 to 35% by weight of at least one organic solvent such as 5 to 20% of xylene, and 1 to 10% of glycol ethers etc., 50 to 70% by weight of metal powder eg. zinc powder, 0.1 to 1.0% by weight of ethyl cellulose, 1.0 to 2.0% by weight of an organic polymeric thickener, 0 to 20% by weight of an inorganic filler including, for example 1.0 to 10% by weight of either mica, clay or mixtures thereof, effective amounts e.g. from 0 to 20% by weight of coloring agents or pigment and catalytic amounts i.e. amounts ranging from about 0.1 to about 1.5% by weight of an alkali metal nitrate selected from the group consisting of lithium nitrate, potassium nitrate and sodium nitrate.

Initially, single package zinc-rich coating were unsatisfactory in that, for example, the coatings had a jagged cut produced by scribe and comparatively short shelf life. It was found, however, that certain metal catalysts, i.e. alkali metal nitrates such as lithium nitrate gave crosshatch adhesion comparable to the competitive two package system within the first 24 hours of application. Moreover, the pencil hardness was improved when the alkali metal nitrates were used as the catalyst. The alkali metal nitrates are neutral or slightly alkaline in aqueous solution and therefore are not Lewis acids. Similar catalysts such as the chlorides, i.e. lithium chloride had the disadvantage of gassing in the container, whereas lithium nitrate improved the coating with respect to early cure and package stability. The alkali metal nitrates were effective at improving the crosshatch adhesion within the first hour after application and the package stability was maintained for at least 17 months at 120° F.

It is known that the zinc-rich coatings containing the ethyl silicates cure by hydrolysis and condensation to form the polysilicate. The first step of hydrolysis yields silicic acid and ethanol and the condensation of the silanol groups as they are formed result in the polysilicates. The zinc metal in the coating reacts with some of the silanol groups thereby becoming part of the zinc silicate matrix where it functions as the anode and protects the metal. In the single package systems of this invention, the ethyl silicate is hydrolyzed to levels preferably from about 40 to 65% such that the reactive silanols are not present. This allows the zinc to be added to the package during the manufacturing operation which contributes to the longer shelf life. For example, excellent package stability was obtained for 17 months at 0.4% concentration and at 11 months at 1.0% concentration at 120° F. The explanation for the outstanding stability of the metal nitrates is that the nitrate ion, is an anodic passivator which takes part in the oxidation reaction with zinc and does not generate hydrogen as a by-product. After six months at 120° F., the coating samples containing 1% by weight of lithium nitrate were temporarily removed from the hot room and recoated. The early crosshatch adhesion was found to be at least as good if not better than the initial test.

In order to facilitate the handling and application of the coatings, the compositions comprise volatile organic solvents including the aliphatic and aromatic hydrocarbons, alcohols, glycol ethers, and the like. Specific examples of solvents include the mineral spirits, naphthas, hydrocarbons such as heptane, hexane, toluene, xylene, alcohols such as butyl alcohol, ethylene glycol monoethyl ether, ethylene glycol monobutyl ether, diethylene glycol ethers, and the like. Solvent is added to the vehicle over the course of mixing and grinding of the compositions so the vehicle has a viscosity sufficiently low to allow mixing with the zinc and other pigments.

The coatings of this invention, depending on the particular end use, may include various other additives known in the coating art including, for example, flow control agents, surfactants, antisettling agents and the like. The amount of each of these additives depends on the particular materials and the ultimate end use of the coating. The critical amounts of these additives are known to those skilled in the art and can be readily ascertained through routine experimentation.

Single package zinc-rich coatings were prepared using lithium nitrate as the catalyst from the formula of Example 1. The data in Table 1 illustrates the stability of the coatings where lithium nitrate was used as the catalyst as distinguished from lithium chloride.

TABLE 1

| Catalysis of One-Package Zinc-Rich Primer Using $LiNO_3$ | | | | |
|---|---|---|---|---|
| | Alcohol | 24 Hr. Dry @ 50% R.H. | | 120° F. |
| Catalyst | Soluble | Crosshatch[1] | Pencil | Stability |
| None | — | 0B | Fail 5B | 17 months |
| 0.4% LiCl | Yes | 3B | 3B | <3 month |
| 0.4% $LiNO_3$ | Yes | 2B | Fail 5B | 17 months |
| 1.0% $LiNO_3$ | Yes | 3B | — | 11 months |

[1]ASTM D3359 (5B = Best)

Other single package zinc-rich coatings were prepared using lithium nitrate as a catalyst from Examples 2 through 5, and then tested for resistance to salt spray and hardness of the coating as illustrated by the data in Table 2.

TABLE 2

| Evaluation of $LiNO_3$ Catalyzed Primers in Salt Spray | | | | |
|---|---|---|---|---|
| | | | 4000 Hrs. SS Topcoated[2] | |
| Catalyst | Variables | Crosshatch[1] | Rust[3] | Blisters[4] |
| None | 3.8% Hyd. Clay | 0B | 6 | No. 2, Few |
| 0.4% $LiNO_3$ | 3.8% Hyd. Clay | 2B | 6 | No. 8, Med. |
| None | 3.8% Hyd. Clay | 0B | 7 | No. 2, Few |
| 0.7% $LiNO_3$ | 3.8% Hyd. Clay | 4B | 5 | No. 2, Few |

TABLE 2-continued

Evaluation of LiNO₃ Catalyzed Primers in Salt Spray

| Catalyst | Variables | Crosshatch[1] | 4000 Hrs. SS Topcoated[2] Rust[3] | Blisters[4] |
|---|---|---|---|---|
| 1.0% LiNO₃ | 3.8% Hyd. Clay | 4B | 5 | No. 2, Few |
| 0.4% LiNO₃ | 3.8% Act. Al₂O₃ | 2B | 6 | No. 9, Med. |

[1] ASTM D3359 (5B = Best)
[2] Sandblasted steel, 2-3 mils zinc-rich primer, 5-6 mils Tile-Clad II topcoat.
[3] 10 = Best; 0 — worst
[4] ASTM D714

The lithium nitrate containing coatings were evaluated for salt spray resistance at levels of 0.4, 0.7 and 1.0% of the total composition. The results after 4000 hours in salt spray showed that the topcoated primer containing from about 0.4 to 1.0% of lithium nitrate had no significant adverse effect on salt spray resistance with respect to blistering and rusting as particularly pointed out in Table 2. Additional results obtained from the series of tests showed that improved topcoat performance was achieved by the use of certain drying agents i.e. 3.8% by weight of alumina or 2.0% by weight of triethylorthoformate.

The following are specific illustrations of the coating compositions of this invention:

| Percent By Weight | Components |
|---|---|
| | EXAMPLE 1 |
| 5.74 | Glycol Ether |
| 5.74 | Xylene |
| 0.38 | Ethyl Cellulose |
| 3.78 | Mica |
| 3.78 | Clay |
| 1.28 | Ferrite Yellow Pigment |
| 0.94 | Sodium Silico-Aluminate |
| 1.72 | Polymeric Thickener |
| 7.85 | Prehydrolyzed Ethyl Silicate (33% SiO₂) |
| 4.59 | Xylene |
| 63.80 | Zinc Dust |
| 0.40 | Lithium Nitrate |
| | EXAMPLE 2 |
| 5.74 | n-Propoxypropanol |
| 4.52 | Xylene |
| 0.37 | Ethyl Cellulose |
| 3.79 | Mica |
| 3.79 | Clay |
| 1.22 | Ferrite Yellow Pigment |
| 0.98 | Sodium Silico-Aluminate |
| 1.71 | Polymeric Thickener |
| 7.82 | Prehydrolyzed Ethyl Silicate (33% SiO₂) |
| 6.11 | Xylene |
| 63.55 | Zinc Dust |
| 0.40 | Lithium Nitrate |
| | EXAMPLE 3 |
| 5.74 | n-Propoxypropanol |
| 4.52 | Xylene |
| 0.37 | Ethyl Cellulose |
| 3.79 | Mica |
| 3.79 | Activated Alumina |
| 1.22 | Ferrite Yellow Pigment |
| 0.98 | Sodium Silico-Aluminate |
| 1.71 | MPA-60 24% Solid Xylene |
| 7.82 | Prehydrolyzed Ethyl Silicate (33% SiO₂) |
| 6.11 | Xylene |
| 63.55 | Zinc Dust |
| 0.40 | Lithium Nitrate |
| | EXAMPLE 4 |
| 5.73 | n-Propoxypropanol |
| 4.51 | Xylene |
| 0.37 | Ethyl Cellulose |
| 3.78 | Mica |
| 3.78 | Clay |
| 1.22 | Ferrite Yellow Pigment |
| 0.97 | Sodium Silico-Aluminate |
| 1.71 | Polymeric Thickener |
| 7.80 | Prehydrolyzed Ethyl Silicate (33% SiO₂) |
| 6.09 | Xylene |
| 63.36 | Zinc Dust |
| 0.69 | Lithium Nitrate |
| | EXAMPLE 5 |
| 5.71 | n-Propoxypropanol |
| 4.49 | Xylene |
| 0.36 | Ethyl Cellulose |
| 3.77 | Mica |
| 3.77 | Clay |
| 1.21 | Ferrite Yellow Pigment |
| 0.97 | Sodium Silico-Aluminate |
| 1.70 | Polymeric Thickener |
| 7.77 | Prehydrolyzed Ethyl Silicate (33% SiO₂) |
| 6.07 | Xylene |
| 63.17 | Zinc Dust |
| 1.00 | Lithium Nitrate |

While this invention has been described by a number of specific embodiments, it is obvious that there are other variations and modifications which can be made without departing from the scope of the invention as particularly set forth in the appended claims.

The invention claimed is:

1. A single package zinc-rich coating comprising by weight of the total composition from about 1.0 to 20% by weight of a partially hydrolyzed ethyl silicate, 1.0 to 50% by weight of at least one organic solvent, 30 to 75% by weight of zinc dust and a catalytic amount of an alkali metal nitrate selected from the group consisting of potassium nitrate, lithium nitrate, and sodium nitrate.

2. The coating of claim 1 further characterized as comprising from about 0 to 20% by weight of an inorganic filler.

3. The coating of claim 1 further characterized as comprising from about 0 to 5.0% by weight of pigment.

4. The coating of claim 1 further characterized as comprising from about 0 to 2.0% by weight of ethyl cellulose.

5. The coating of claim 1 further characterized as comprising from about 0 to 5.0% by weight of an organic polymeric thickener.

6. The coating of claim 1 further characterized in that the catalytic amount of the alkali metal nitrate ranges from about 0.1 to 1.5% by weight of lithium nitrate.

7. The coating of claim 1 further characterized in that the ethyl silicate is hydrolyzed to levels of 50 to 65%.

8. The coating of claim 1 further characterized in that the zinc dust is present in an amount ranging from about 50 to 70% by weight of the coating.

9. The coating of claim 1 further characterized in that the organic solvent comprises from about 1.0 to 10% by weight of glycol ethers and 5.0 to 20% by weight of xylene.

10. A single package zinc-rich coating comprising by weight of the total composition from about 5 to 15% by weight of ethyl silicate hydrolyzed to levels of 40 to 65%, 1.0 to 35% by weight of at least one organic solvent, 50 to 70% by weight of zinc dust, 0.1 to 1.0% by weight of ethyl cellulose, 1.0 to 10% by weight of mica, 1.0 to 10% by weight of clay, 1.0 to 2.0% by weight of an organic polymeric thickener, 0 to 2.0% by weight of pigment and catalytic amounts of 0.1 to 1.5% by weight of lithium nitrate.

* * * * *